United States Patent
Sim et al.

(10) Patent No.: US 7,106,127 B2
(45) Date of Patent: Sep. 12, 2006

(54) TEMPERATURE SENSOR AND METHOD FOR DETECTING TRIP TEMPERATURE OF A TEMPERATURE SENSOR

(75) Inventors: Jae-Yoon Sim, Suwon (KR); Jei-Hwan Yoo, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/627,693

(22) Filed: Jul. 28, 2003

(65) Prior Publication Data

US 2004/0071191 A1 Apr. 15, 2004

(30) Foreign Application Priority Data

Aug. 9, 2002 (KR) .............................. 2002-46993

(51) Int. Cl.
*H01L 35/00* (2006.01)

(52) U.S. Cl. ...................................... 327/512; 374/178

(58) Field of Classification Search ................ 327/512, 327/513; 374/172, 178, 183, 185
See application file for complete search history.

(56) References Cited

U.S. PATENT DOCUMENTS

| | | | | |
|---|---|---|---|---|
| 4,014,238 A | * | 3/1977 | Southard ...................... | 84/682 |
| 4,395,139 A | * | 7/1983 | Namiki et al. ............... | 374/178 |
| 4,465,379 A | * | 8/1984 | Misawa et al. .............. | 368/202 |
| 5,025,248 A | | 6/1991 | Bergeron | |
| 5,375,093 A | | 12/1994 | Hirano ........................ | 365/222 |
| 5,638,418 A | | 6/1997 | Douglass et al. | |
| 5,739,593 A | * | 4/1998 | Hayama ........................ | 307/43 |
| 5,795,069 A | * | 8/1998 | Mattes et al. ................ | 374/183 |
| 5,835,553 A | | 11/1998 | Suzuki | |
| 5,875,142 A | * | 2/1999 | Chevallier ................... | 365/212 |
| 5,961,215 A | | 10/1999 | Lee et al. | |
| 6,157,244 A | * | 12/2000 | Lee et al. ..................... | 327/539 |
| 6,281,760 B1 | | 8/2001 | Koelling et al. .............. | 331/66 |
| 6,299,347 B1 | | 10/2001 | Pompei | |
| 6,316,988 B1 | * | 11/2001 | Forehand et al. ........... | 327/538 |
| 6,316,991 B1 | * | 11/2001 | Muyshondt et al. ........ | 327/543 |
| 6,320,809 B1 | * | 11/2001 | Raad ........................... | 365/226 |
| 6,348,832 B1 | | 2/2002 | Chih | |
| 6,489,831 B1 | | 12/2002 | Matranga et al. | |
| 6,504,420 B1 | | 1/2003 | Vorenkamp et al. | |
| 6,591,210 B1 | | 7/2003 | Lorenz | |
| 6,643,193 B1 | | 11/2003 | Yamaki et al. | |
| 6,667,925 B1 | * | 12/2003 | Kobayashi et al. ......... | 365/211 |

FOREIGN PATENT DOCUMENTS

| | | |
|---|---|---|
| JP | 2003297929 | 10/2003 |
| KR | 1020020056382 A | 7/2003 |
| KR | 2004-13885 | 2/2004 |

* cited by examiner

*Primary Examiner*—Kenneth B. Wells
(74) *Attorney, Agent, or Firm*—Volentine Francos& Whitt, pllc

(57) ABSTRACT

A comparator circuit of a temperature sensor includes an output node and a variable current node. The output node is a first voltage at a given temperature when a current at the variable current node is less than a threshold current, and a different second voltage at the given temperature when the current at the variable current node is more than the threshold current. A variable resistance circuit includes at least n resistors of different resistive values connected in series between the variable current node of the comparator and a supply voltage, where n is an integer of 4 or more. A switching circuit is provided to selectively bypasses individual ones of the n resistors during a test sequence to determine a trip temperature of the sensor.

8 Claims, 8 Drawing Sheets

TEMPERATURE SENSOR AND METHOD FOR DETECTING TRIP TEMPERATURE OF A TEMPERATURE SENSOR

BACKGROUND OF THE INVENTION

1. Field of the Invention

The present invention relates to a temperature sensor having a trip temperature detection circuit, and to a method for detecting a trip temperature of a temperature sensor.

2. Description of the Related Art

A dynamic random access memory (DRAM) is a volatile memory in which the memory cells thereof must be periodically refreshed in order to maintain the data stored in the memory cells. Disadvantageously, a relatively large amount of power is consumed during each of these DRAM refresh operations.

It is known that data is preserved longer in DRAM memory cells at lower temperatures. As such, the lower the temperature, the less frequently the memory cells need to be refreshed. Therefore, in an effort to reduce power consumption, the frequency of a refresh clock may be reduced at lower temperatures. Since a lower refresh clock frequency results in fewer refresh operations per unit time, less power is consumed. However, this technique requires the additional provision of a temperature sensor, preferably one which exhibits low power consumption.

FIG. 1 illustrates the circuit configuration of a conventional temperature sensor.

Referring to FIG. 1, the temperature sensor 100 includes a differential amplifier DA which is configured as a type of current mirror having branches A and B. The differential amplifier includes transistors MP1, MN1, MP2 and MN2 as shown, with branch A including a resistance R and a diode D2, and with the branch B including a diode D1. Also provided are transistors MP3 and MN3, as shown, and a third branch C of the temperature sensor is defined by resistance R1. As explained below, a comparator OP1 receives and compares a signal OT1 indicative of a sensed temperature and a signal 0Ref indicative of a reference temperature. The output OUT of the comparator OP1 is high or low depending on whether or not the sensed temperature OT1 exceeds the reference temperature ORef.

The junction diodes D2, D1 of branches A, B have the same diode characteristics. Likewise, the p-type MOS transistors MP1, MP2, MP3 are all of the same size, and the n-type MOS transistors MN1, MN2, MN3 are all of the same size. Here, the term "size" denotes the product of a channel length L and a gate width W of each transistor.

In operation, since the voltage drops across MP2 and MN2 become the same as those across MP1 and MN1, respectively, which become the same as those across MP3 and MN3, respectively, it follows that voltage VA of branch A (i.e., the voltage across R and D2) is the same as the voltage VB of branch B (i.e., the voltage across D1), which is the same as the voltage VC of branch C (i.e., the voltage across R1). Thus, it also follows that $$VR + VD2 = VD1 = VR1$$

where VR is the voltage across the resistance R, VD2 is the voltage across the diode D2, VD1 is the voltage across the diode D1, and VR1 is the voltage across the resistance R1.

A current $I_D$ and voltage $V_D$ of a junction diode may be generally expressed as $$I_D = I_s(e^{V_D/V_T} - 1) \approx I_s(e^{V_D/V_T})$$

$$V_D = V_T \cdot \ln(I_D/I_s)$$

where $I_s$ denotes an inverse saturation current, $V_D$ denotes the diode voltage, and $V_T$ denotes a thermal voltage. The thermal voltage $V_T$ equals $kT/q$, where k is Boltzmann's constant, T is absolute temperature, and q is electron charge.

From the aforementioned equations, the following relationship can be established:

$$Ir = V_T \cdot \ln(Ir/IO)/R.$$

Since the thermal voltage $V_T$ is proportional to temperature, it follows that the current Ir of branch A is proportional to temperature.

As noted previously, a diode voltage may be generally expressed as $$V_D = V_T \cdot \ln(I_D/I_s)$$

Generally, the inverse saturation current $I_s$ increases with temperature to a much greater extent than the thermal voltage $V_T$, and accordingly, the diode voltage $V_D$ is reduced with an increase in temperature. For this reason, the voltage VD2 of diode D2 decreases with an increase in temperature. Therefore, the voltage VC of branch C also decreases with an increase in temperature, which means that the current I1 is reduced with an increase in temperature.

As such, the current Ir of branch A increases with an increase in temperature, and the current I1 of branch C decreases with an increase in temperature. This relationship is illustrated in FIG. 2, where the axis I denotes current and the axis T denotes temperature. The intersection between Ir and I1 is the trip temperature T1 of the temperature sensor, i.e., the temperature at which OT1 and ORef are the same.

The trip temperature of the sensor can be set by design according to the value of the resistance R1. That is, as shown in FIG. 2, a reduction in the resistance R1 increases the current I1 of branch C, which in turn increases the trip temperature T1 at the cross point of I1 and Ir. In contrast, an increase in resistance R1 decreases the current I1 of branch C, which decreases the trip temperature T1 at the cross point of I1 and Ir. Relying on these relationships, a design value of R1 is selected to achieve a desired trip temperature.

However, the operational characteristics of the temperature sensor of FIG. 1 are highly sensitive to variations in the fabrication processes. Particularly, the actual trip temperature may differ from a designed trip temperature by a certain amount (referred to herein as a "temperature shift"). In order to compensate for this temperature shift, it is necessary to tune the sensor by increasing or decreasing the value of the resistor R1 of branch C. Typically, lasers are used in accordance with well known methods to trim the resistor R1 to the proper resistance level. Preferably, this tuning process is performed at a wafer level for each individual chip.

In order to know the amount of trimming of the resistor R1 that is needed, it is first necessary to know the amount of temperature shift that must be compensated. The conventional technique for determining temperature shift is to place the wafer in a process chamber and vary an interior temperature of the process chamber while monitoring the output signal OUT of the comparator OP1. The chamber temperature at which the output signal OUT changes state is the actual trip temperature of the sensor, and the delta between the actual trip temperature and the design trip temperature is the temperature shift that must be compensated.

Varying the chamber temperature in an attempt to locate the actual trip temperature of the sensor takes a substantial amount of time. Also, the reliability of the temperature measurement and transistor trimming are not always sufficient, and accordingly, it is often necessary to repeat the process of varying chamber temperature to identify the trip temperature after each trimming operation of the resistor R1. In short, the conventional process of setting the trip temperature is very time consuming, thus adversely impacting throughput and costs.

SUMMARY OF THE INVENTION

According to one aspect of the present invention, a temperature sensor is equipped with a comparator circuit having an output node and a variable current node. The output node is a first voltage at a given temperature when a current at the variable current node is less than a threshold current, and a different second voltage at the given temperature when the current at the variable current node is more than the threshold current. The sensor is also equipped with a variable resistance circuit and a switching circuit. The variable resistance circuit includes at least n resistors of different values connected in series between the variable current node of the comparator and a supply voltage, where n is an integer of 4 or more, and the switching circuit selectively bypasses individual ones of the n resistors.

According to another aspect of the present invention, a temperature sensor is equipped with a comparator circuit having an output node and a variable current node. The output node is a first voltage at a given temperature when a current at the variable current node is less than a threshold current, and a different second voltage at the given temperature when the current at the variable current node is more than the threshold current. The temperature sensor is further equipped with first and second variable resistance circuits connected in series between the variable current node of the comparator and a supply voltage. The first variable resistance circuit includes n resistors connected in series, where n is an integer of 4 or more and the n resistors have different resistance values, and the second variable resistance circuit includes m resistors connected in series, where m is an integer of 4 or more and the m resistors have different resistance values. The temperature sensor is still further equipped with a first switching circuit which selectively bypasses individual ones of the n resistors of the first variable resistance circuit, and a second switching circuit which selectively bypasses individual ones of the m resistors of the second variable resistance circuit.

According to another aspect of the present invention, a temperature sensor is equipped with a comparator circuit having an output node and a variable current node, wherein the output node is a first voltage at a given temperature when a current at the variable current node is less than a threshold current, and a different second voltage at the given temperature when the current at the variable current node is more than the threshold current. The temperature sensor is further equipped with a variable resistance circuit including a plurality of resistors connected in series, and a trimming circuit which selectively electrically connects or disconnects individual ones of the resistors variable resistance circuit to the variable current node.

According to yet another aspect of the present invention, a method of determining a trip temperature of a temperature sensor is provided, where the temperature sensor is equipped with (a) a comparator circuit having an output node and a variable current node, wherein the output node is a first voltage at a given temperature when a current at the variable current node is less than a threshold current, and a different second voltage at the given temperature when the current at the variable current node is more than the threshold current, and (b) a variable resistance circuit connected in series between the variable current node of the comparator and a reference voltage. The method includes fixing a temperature of the temperature sensor to a reference temperature, and varying a resistance of the variable resistance circuit to determine a difference between an initial resistance and a resistance at which the output node of the comparator oscillates between the first and second voltages, where the difference corresponds to a change in trip temperature of the sensor. The trip temperature is calculated according to the reference temperature and the change in trip temperature of the sensor.

According to yet another aspect of the present invention, a method of determining a trip temperature of a temperature sensor is provided, where the temperature sensor is equipped with (a) a comparator circuit having an output node and a variable current node, where the output node is a first voltage at a given temperature when a current at the variable current node is less than a threshold current, and a different second voltage at the given temperature when the current at the variable current node is more than the threshold current, and (b) a variable resistance circuit including at least resistors $R_1, R_2, \ldots R_n$ which are selectively connected in series between the variable current node of the comparator and a supply voltage, where n is an integer of 4 or more, and where $R_1 < R_2, \ldots R_{n-1} < R_n$. The method includes fixing a temperature of the temperature sensor to a first temperature, and conducting a test sequence in which the resistor $R_n$ is connected between the variable current node of the comparator and the supply voltage, and in which the resistor $R_n$ is set to remain connected between the variable current node and the supply voltage if the output node of the comparator is the first voltage, and the resistor $R_n$ is bypassed between the variable current node and the supply voltage if the output node of the comparator is the second voltage. The test sequence is repeated for each of the remaining resistors $R_{n-1}$ to $R_1$ in order. Then, upon completion of the final test sequence for the resistor $R_1$, the method further includes determining a trip resistance of the temperature sensor as a difference between the first temperature and an adjustment temperature corresponding to a total value of the resistors $R_1, R_2, \ldots R_n$ which were set to remain connected between the variable current node and the supply voltage of the output node of the comparator.

According to yet another aspect of the present invention, a method of determining a trip temperature of a temperature sensor is provided, where the temperature sensor is equipped with (a) a comparator circuit having an output node and a variable current node, wherein the output node is a first voltage at a given temperature when a current at the variable current node is less than a threshold current, and a different second voltage at the given temperature when the current at the variable current node is more than the threshold current, and (b) a variable resistance circuit connected in series between the variable current node of the comparator and a reference voltage. The method includes conducting a first test which includes (a) fixing a temperature of the temperature sensor to a first reference temperature, and (b) increasing a resistance of the variable resistance circuit to determine a difference between an initial resistance and a resistance at which the output node of the comparator oscillates between the first and second voltages, where the difference corresponds to a first change in trip temperature of the sensor. The method still further includes conducting a second test which includes (a) fixing a temperature of the temperature sensor to a second reference temperature, and (b) decreasing a resistance of the variable resistance circuit to determine a difference between an initial resistance and a resistance at which the output node of the comparator oscillates between the first and second voltages, where the difference corresponds to a second change in trip temperature of the sensor. The trip temperature is calculated according to the first and second reference temperatures and the first and second changes in trip temperature of the sensor.

BRIEF DESCRIPTION OF THE DRAWINGS

The various aspects and features of the present invention will become readily apparent from the detailed description that follows, with reference to the accompanying drawings, in which.

DETAILED DESCRIPTION OF THE PREFERRED EMBODIMENTS

Hereinafter, preferred embodiments of the present invention will be described in detail with reference to the accompanying drawings. The described embodiments are examples only, and are not to be construed as limiting the scope of the invention.

Figure 1:
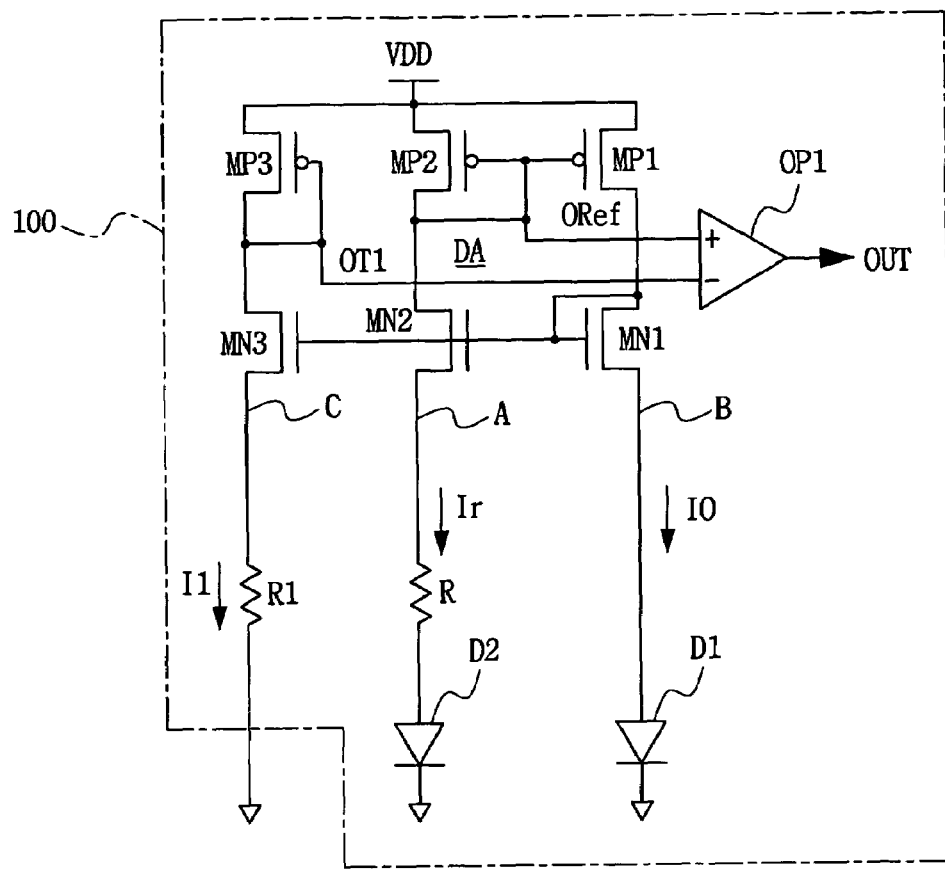
FIG. 1 is a circuit diagram of a conventional temperature sensor.
Figure 3:
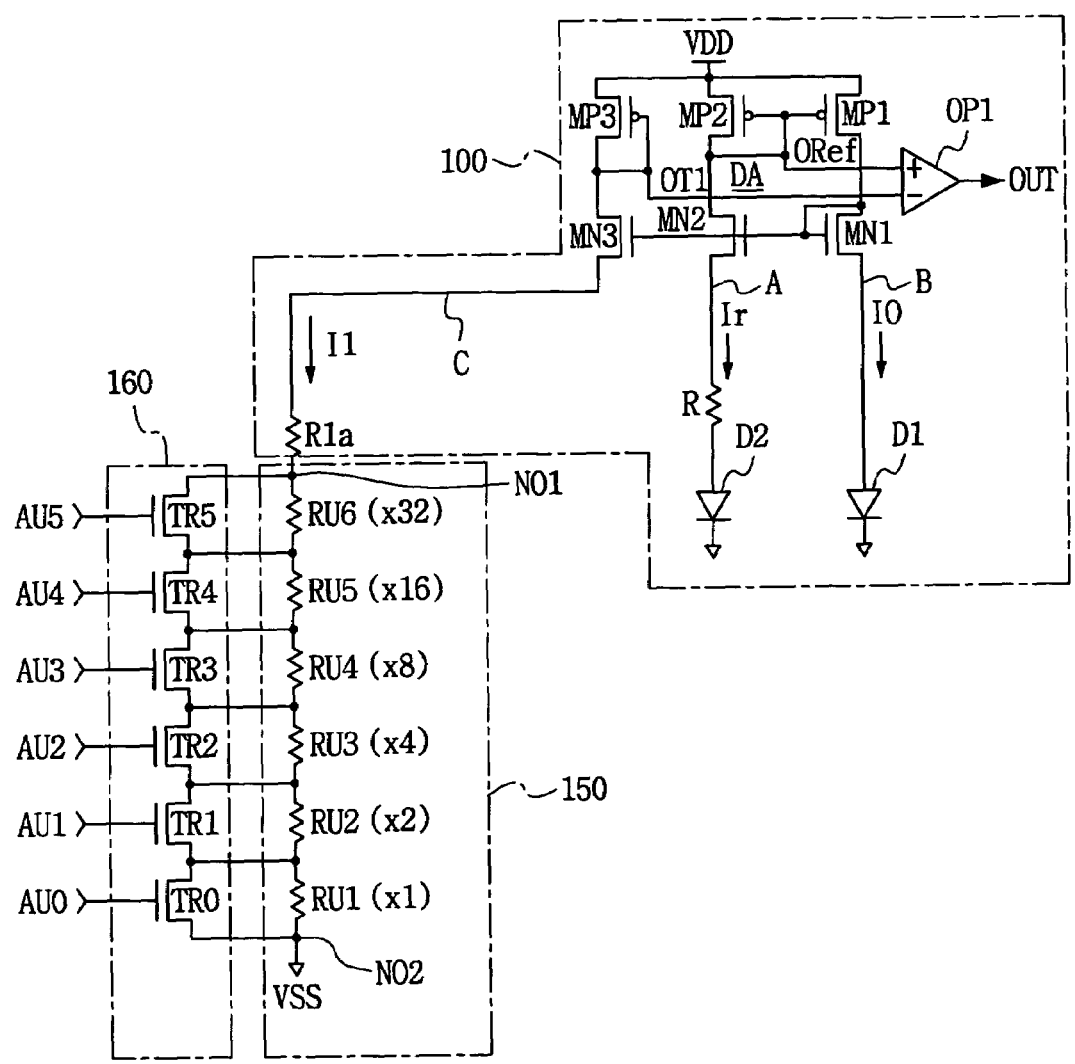
FIG. 3 is a circuit diagram of a temperature sensor in accordance with an embodiment of the present invention.

FIG. 3 is a circuit diagram of a temperature sensor in accordance with an embodiment of the present invention. As shown, the temperature sensor is equipped with a comparator circuit 100 having an output node OUT and a variable current node N01. The comparator circuit is configured such that the output node OUT is a first voltage when the branch C current I1 is greater than the branch A current Ir, and a different second voltage when the current I1 is less than the current Ir. In this embodiment, the comparator circuit 100 is configured in the same manner as the conventional circuit of FIG. 1 discussed previously. Accordingly, like reference numbers are used to denote like elements in FIGS. 1 and 3, and a detailed discussion of the comparator circuit 100 of FIG. 3 is omitted here to avoid redundancy.

The temperature sensor of FIG. 3 is also equipped with a variable resistance circuit 150 and a switching circuit 160. The variable resistance circuit 150 includes at least n resistors of different values connected in series between the variable current node N01 and a supply voltage VSS (node N02). Here, n is an integer of 4 or more. The switching circuit 160 is configured to selectively bypass individual ones of the n resistors of the variable resistance circuit 160.

The n resistors may have arbitrarily different values, or they may have a mathematical relationship to one another. For example, where one resistor among the n resistors has a lowest resistance value, the remaining resistors among the n resistors may have resistance values which are multiples of the lowest resistance value. In this embodiment, however, the variable resistance circuit 150 is configured by a binary weighted resistance string of resistors RU1, RU2, RU3, RU4, RU5 and RU6, where, $$RU6=2 \cdot RU5=4 \cdot RU4=8 \cdot RU3=16 \cdot RU2=32 \cdot RU1$$

The switching circuit 160 in this embodiment is configured by transistors TR0, TR1, TR2, TR3, TR4 and TR5, which are respectively connected across the resistors RU1–RU6. The transistors TR0–TR5 selectively bypass or short the resistors RU1–RU6 when turned on in response to input test signals AU0, AU1, AU2, AU3, AU4 and AU5. In this example, the transistors TR5–TR0 are N-type MOS transistors which are normally turned OFF, which means that the resistors RU1–RU6 are normally connected in series to the branch C of the comparator circuit 100.

It is noted that the term "resistor" is broadly used herein to denote the presence of an electrical resistance between given nodes of the circuits of the invention. The electrical resistance defining each resistor can be physically implemented a number of different ways, such as by a series connection of multiple IC resistive polysilicon patterns. Also, resistors which are said to have different resistive values can be configured by varying the number of series-connected resistive elements, where the resistive elements themselves have the same resistance values.

As is apparent in FIG. 3, the resistance amount of branch C is equal to the resistance R1a combined with any of resistors RU1–RU6 which have not been bypassed by the respective transistors TR0–TR5. Thus, for example, in the case where all transistors TR0–TR5 are off, the resistance of branch C is, R1a+RU6+RU5+RU4+RU3+RU2+RU1 which is equal to R1a+65RU1.

Figure 2:
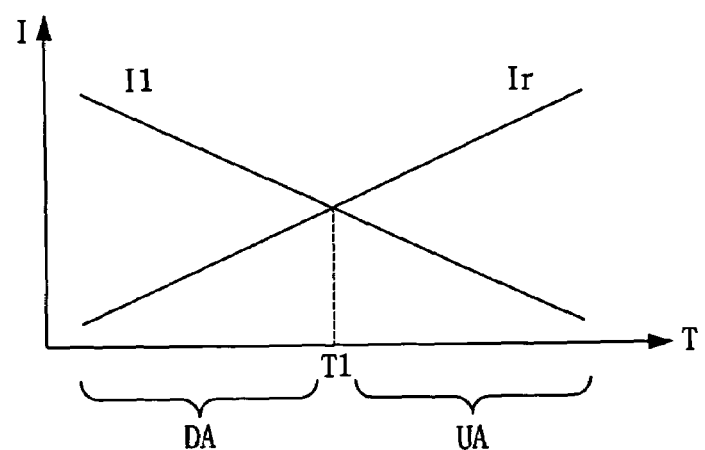
FIG. 2 is a graph showing the relationships between temperature, branch currents, and trip temperature in the conventional temperature sensor of FIG. 1.

As discussed previously in connection with FIGS. 1 and 2, a decrease in the resistance amount of branch C results in an increase in the current I1 of branch C, which in turn results in an increase in the trip temperature T1. For simplicity, the resistance value of the unit resistance RU1 is designed such that a decrease of one unit resistance RU1 in the branch C results in a 1° C. increase in the trip temperature T1. As such, by turning on the transistor TR0 to bypass the resistor RU1, the trip temperature of the sensor is increased by 1° C. It should therefore be apparent that, in this example, the input test signals AU0–AU5 can be used to increase the trip temperature T1 by 1° C. intervals up to 65° C. As examples, an 18° C. increase in trip temperature is achieved by bypassing resistors RU5 and RU2, or a 35° C. increase in trip temperature is achieved by bypassing resistors RU6, RU2 and RU1.

A method of detecting a shift temperature according to an embodiment of the present invention will now be described with reference to FIGS. 3 and 8. In this example, a binary successive approximation method is used to detect the shift temperature within a margin of 1° C.

The method of this embodiment is carried out in a condition where the temperature sensor (contained on a wafer) is placed in a chamber held at a fixed temperature Tc. The fixed temperature may be the same as that used in a burn-in test. In this example, the fixed temperature Tc is 85° C.

Figure 8:
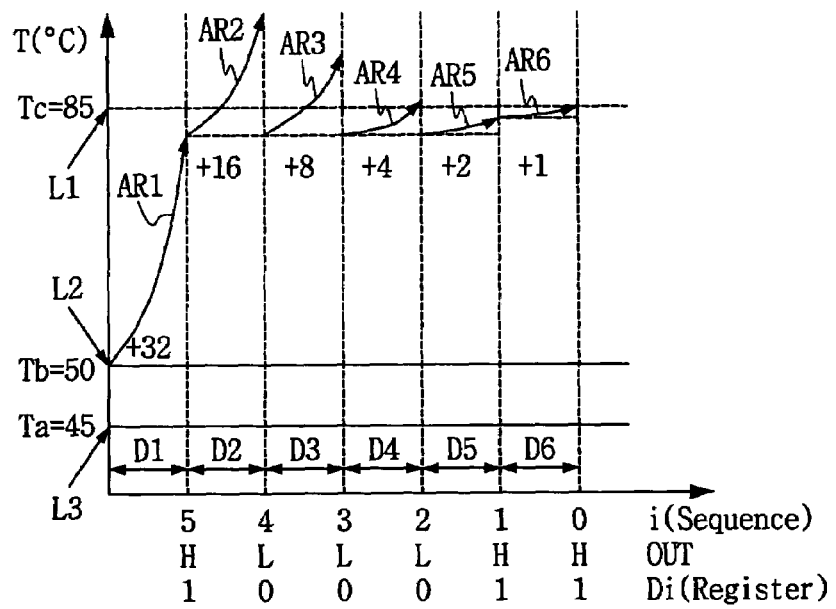
FIG. 8 is a graph for explaining a method of determining a shift temperature of the temperature sensor shown in FIG. 3.

In FIG. 8, it is assumed that the temperature sensor is designed for a target trip temperature Ta of 45° C. Also, it is assumed that process variations have resulted in a shift temperature (error) of 5° C., whereby the unknown actual trip temperature Tb of the sensor is 50° C. The present embodiment is directed to identifying the actual trip temperature Tb (or the shift temperature amount from the target Ta). In FIG. 8, the y-axis denotes temperature, and the x-axis denotes a sequence of process steps.

In an initial state of the sequence, all of AU5–AU0 are set to 0, i.e., AU5–AU0 is a six bit signal of "0,0,0,0,0,0". Thus, all of the transistors TR5–TR0 are turned off, and in this state, the chamber temperature Tc exceeds the actual trip temperature Tb, and the output OUT of the comparator circuit 100 is high (H).

Then, at D1 of FIG. 8, the test signal AU5 is set to 1, thus turning on the transistor TR5 and bypassing the resistor RU6. Here, AU5–AU0 is a six bit signal of "1,0,0,0,0,0". This results in a 32° C. increase in the actual trip temperature Tb (i.e., Tb=50° C.+32° C.=82° C.). However, since the chamber temperature Tc (85° C.) still exceeds the increased actual trip temperature Tb, the output OUT of the comparator circuit remains HIGH (H).

In the binary successive approximation method of the present embodiment, since the output OUT of the comparator circuit 100 remained HIGH (H) at D1 of FIG. 8, AU5 remains set at 1 for the rest of the process sequence. On the other hand, if the output OUT had been LOW (L), than AU5 would be set at 0 for the rest of the process sequence.

Next, at D2 of FIG. 8, AU4 is set to 1, whereby AU5–AU0 is a six bit signal of "1,1,0,0,0,0". This results in a 48° C. increase in the actual trip temperature Tb (i.e., Tb=50° C.+32° C.+16° C.=98° C.). Since the chamber temperature Tc (85° C.) is now less than the increased actual trip temperature Tb, the output OUT of the comparator circuit becomes LOW (L).

If the output OUT of the comparator circuit 100 had remained HIGH (H) at D2 of FIG. 8, then AU4 would be set to 1 during the rest of the process sequence. However, since the output OUT became LOW (L) at D2, the signal AU4 is set to 0 for the rest of the process sequence. Also, the signal AU3 is now set to 1 at D3, whereby AU5–AU0 is a six bit signal of "1,0,1,0,0,0". This results in a 40° C. increase in the actual trip temperature Tb (i.e., Tb=50° C.+32° C.+8° C.=90° C.). Since the chamber temperature Tc (85° C.) is still less than the increased actual trip temperature Tb, the output OUT of the comparator circuit remains LOW (L).

Since the output OUT remained LOW (L) at D3, the signal AU3 is set to 0 for the rest of the process sequence. Also, the signal AU2 is now set to 1 at D4, whereby AU5–AU0 is a six bit signal of "1,0,0,1,0,0". This results in a 36° C. further increase in the actual trip temperature Tb (i.e., Tb=50° C.+32° C.+4° C.=86° C.). Since the chamber temperature Tc (85° C.) is still less than the increased actual trip temperature Tb, the output OUT of the comparator circuit remains LOW (L).

The output OUT remained LOW (L) at D4, so the signal AU2 is set to 0 for the rest of the process sequence. Also, the signal AU1 is now set to 1 at D5, whereby AU5–AU0 is a six bit signal of "1,0,0,0,1,0". This results in a 34° C. increase in the actual trip temperature Tb (i.e., Tb=50° C.+32° C.+2° C.=84° C.). Now the chamber temperature Tc (85° C.) exceeds the increased actual trip temperature Tb, and the output OUT of the comparator circuit becomes HIGH (H).

Since the output OUT became HIGH (H) at D5, the signal AU1 is set to 1 for the rest of the process sequence. Also, the signal AU0 is now set to 1 at D6, whereby AU5–AU0 is a six bit signal of "1,0,0,0,1,1". This results in a 35° C. increase in the actual trip temperature Tb (i.e., Tb=50° C.+32° C.+2° C.+1° C.=85° C.). The chamber temperature Tc (85° C.) is now about equal to the actual trip temperature Tb, and in this example, the output OUT of the comparator circuit remains HIGH (H).

The final set values of AU5–AU0 may then be used to identify the actual trip temperature Tb of the temperature sensor. For example, in FIG. 8, AU5–AU0 were finally set to "1,0,0,0,1,1". These values may be stored in a register and used as a search code to identify the decimal number equivalent of 35° C. The actual trip temperature Tb of the sensor may then be simply calculated by subtracting the search code result from the chamber temperature Tc. In the example of FIG. 8, the search code result is 35° C. and the chamber temperature Tc is 85° C., so the actual trip temperature Tb is 50° C. The shift temperature is the difference between the actual trip temperature Tb and the target trip temperature Ta, which is 5° C. in the example of FIG. 8. In this manner, the shift temperature can be identified without varying the chamber temperature.

Once the shift temperature is determined, a trimming process is executed to bring the actual trip temperature of the sensor to the target trip temperature. In the example of FIG. 8, trimming is executed to decrease the trip temperature by 5° C. If desired, the trimming work can be varified by repeating the process discussed above in connection with FIG. 8.

Figure 4:
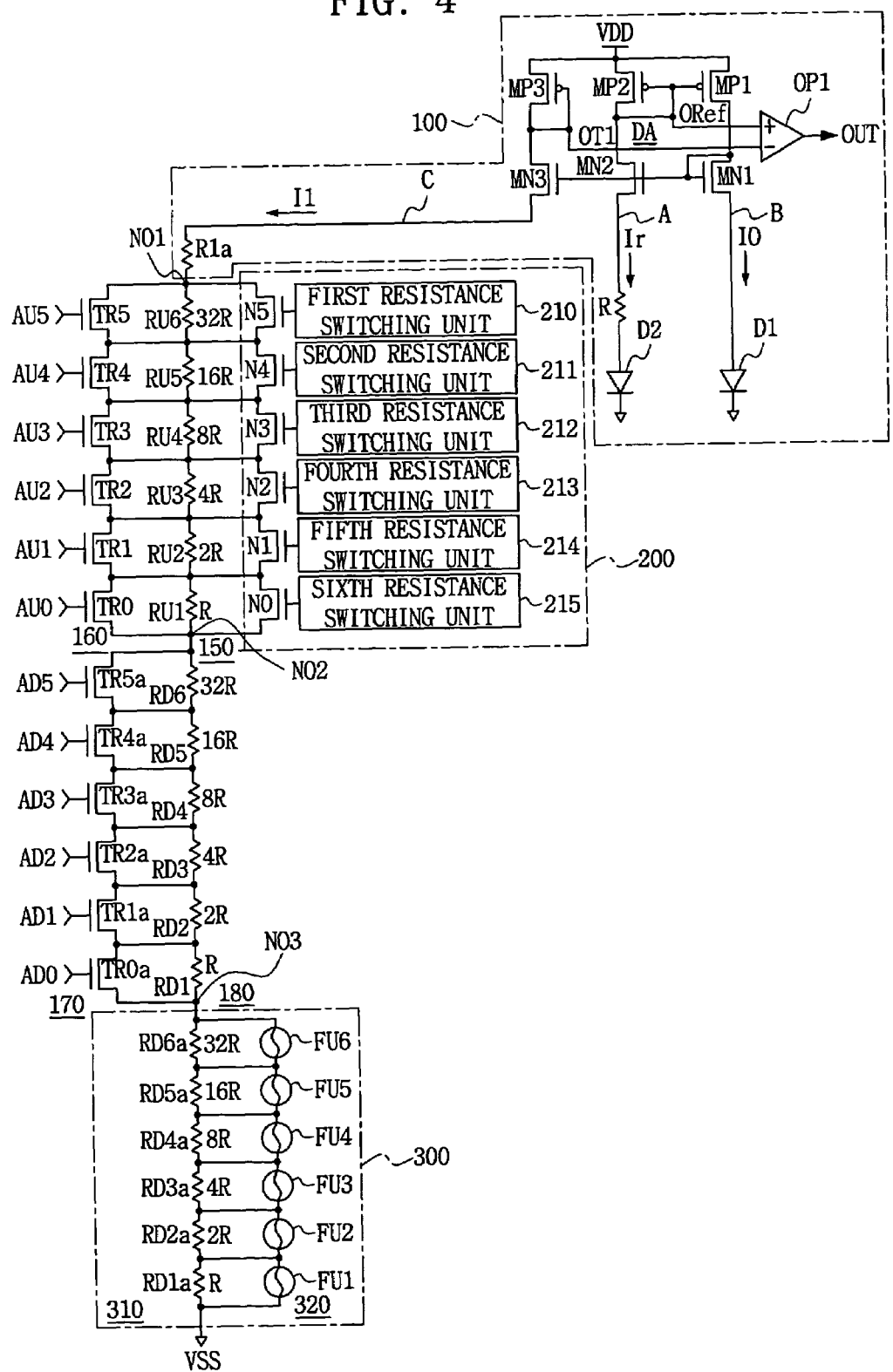
FIG. 4 is a circuit diagram of a temperature sensor in accordance with another embodiment of the present invention.

FIG. 4 is a circuit diagram of a temperature sensor in accordance with another embodiment of the present invention. As shown, the temperature sensor is equipped with a comparator circuit 100 having an output node OUT and a variable current node N01. The comparator circuit is configured such that the output node OUT is a first voltage when the branch C current I1 is greater than the branch A current Ir, and a different second voltage when the current I1 is less than the current Ir. In this embodiment, the comparator circuit 100 is configured in the same manner as the conventional circuit of FIG. 1 discussed previously. Accordingly, like reference numbers are used to denote like elements in FIGS. 1 and 4, and a detailed discussion of the comparator circuit 100 of FIG. 4 is omitted here to avoid redundancy.

The circuit of FIG. 4 also includes a weighted resistance string 150, a switching portion 160, another weighted resistance string 180, another switching portion 170, a temperature increase trimming portion 200, and a temperature decrease trimming portion 300. The weighted resistance strings 150 and 180, and the switching portions 160 and 170 are used to determine the shift temperature of the sensor. The trimming portions 200 and 300 are used in a trimming operation after the shift temperature has been determined.

In this embodiment, the variable resistance circuit 150 is connected between nodes N01 and N02 and is configured by a binary weighted resistance string of resistors RU1, RU2, RU3, RU4, RU5 and RU6, where, $$RU6 = 2 \cdot RU5 = 4 \cdot RU4 = 8 \cdot RU3 = 16 \cdot RU2 = 32 \cdot RU1$$

The switching circuit 160 is configured by transistors TR0, TR1, TR2, TR3, TR4 and TR5, which are respectively connected across the resistors RU1–RU6. The transistors TR0–TR5 selectively bypass or short the resistors RU1–RU6 when turned on in response to input test signals AU0, AU1, AU2, AU3, AU4 and AU5. In this example, the transistors TR5–TR0 are N-type MOS transistors which are normally turned OFF, which means that the resistors RU1–RU6 are normally connected in series to the branch C of the comparator circuit 100.

The variable resistance circuit 180 is connected between nodes N02 and N03 and is configured by a binary weighted resistance string of resistors RD1, RD2, RD3, RD4, RD5 and RD6, where, $$RD6=2 \cdot RD5=4 \cdot RD4=8 \cdot RD3=16 \cdot RD2=32 \cdot RD1$$

The switching circuit 170 in this embodiment is configured by transistors TR0a, TR1a, TR2a, TR3a, TR4a and TR5a, which are respectively connected across the resistors RD1–RD6. The transistors TR0a–TR5a selectively connect the resistors RU1–RU6 to the branch C when turned on in response to input test signals AD0, AD1, AD2, AD3, AD4 and AD5. In this example, the transistors TR5–TR0 are N-type MOS transistors which are normally turned ON, which means that the resistors RU1–RU6 are normally not connected to the branch C of the comparator circuit 100.

A method of using the weighted resistor strings 150 and 180 and the switching circuits 160 and 170 to determine the shift temperature of the sensor will be described later with reference to FIG. 10. First, however, a potential drawback of the temperature sensor of FIG. 3 will be discussed.

In particular, the previous description of the embodiment of FIG. 3 and FIG. 8 was presented for the ideal case where a decrease in resistance equal to the unit resistor RU1 caused an exact 1° C. increase in trip temperature. Limitations in the fabrication process, however, may make it difficult achieve such an ideal relationship between RU1 and trip temperature. This in turn can result in errors in the determination of the shift temperature.

Figure 9:
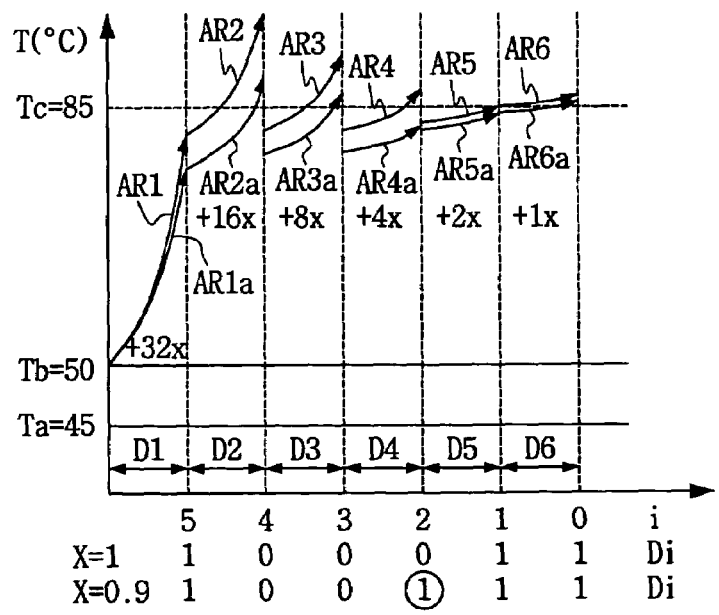
FIG. 9 is a graph for explaining the effect of using non-ideal resistors when determining a shift temperature of the temperature sensor shown in FIG. 3.

For example, reference is made to the graph of FIG. 9. This graph illustrates the same process of FIG. 8, except that both the ideal case and a non-ideal case are shown. In particular, the ideal case is where "X=1", i.e., a decrease in resistance equal to the unit resistor RU1 causes an exact 1° C. increase in trip temperature. In contrast, the non-ideal case is where "X=0.9", i.e., a decrease in resistance equal to the unit resistor RU1 causes a 0.9° C. increase in trip temperature. The illustrated arrows AR1, AR2, AR3, AR4, AR5 and AR6 are associated with the ideal case of X=1, and are the same as the corresponding arrows of FIG. 8. In this case, a search code of "1,0,0,0,1,1" is obtained which can be used to accurately determine the shift temperature. On the other hand, the illustrated arrows AR1a, AR2a, AR3a, AR4a, AR5a and AR6a are associated with the non-ideal case of X=0.9. In this case, an incorrect search code of "1,0,0,1,1,1" is obtained which, if used, would result in an inaccurate determination of the shift temperature. Specifically, the decimal equivalent of "1,0,0,1,1,1" is 39° C., and the calculated actual trip temperature would be 46° C. (85° C.−39° C.). Thus, the shift temperature would incorrectly be identified as 1° C., rather than 5° C. As described next with reference to FIGS. 6 and 10, this potential drawback of the embodiment of FIG. 3 can be overcome by use of the circuit shown in FIG. 4.

The method of this embodiment is carried out in a condition where the temperature sensor (contained on a wafer) is placed in a chamber and successively held at first and second fixed temperatures Tc and Td. In the example below, the first fixed temperature Tc is 85° C. and the second fixed temperature Tc is −5° C.

Figure 10:
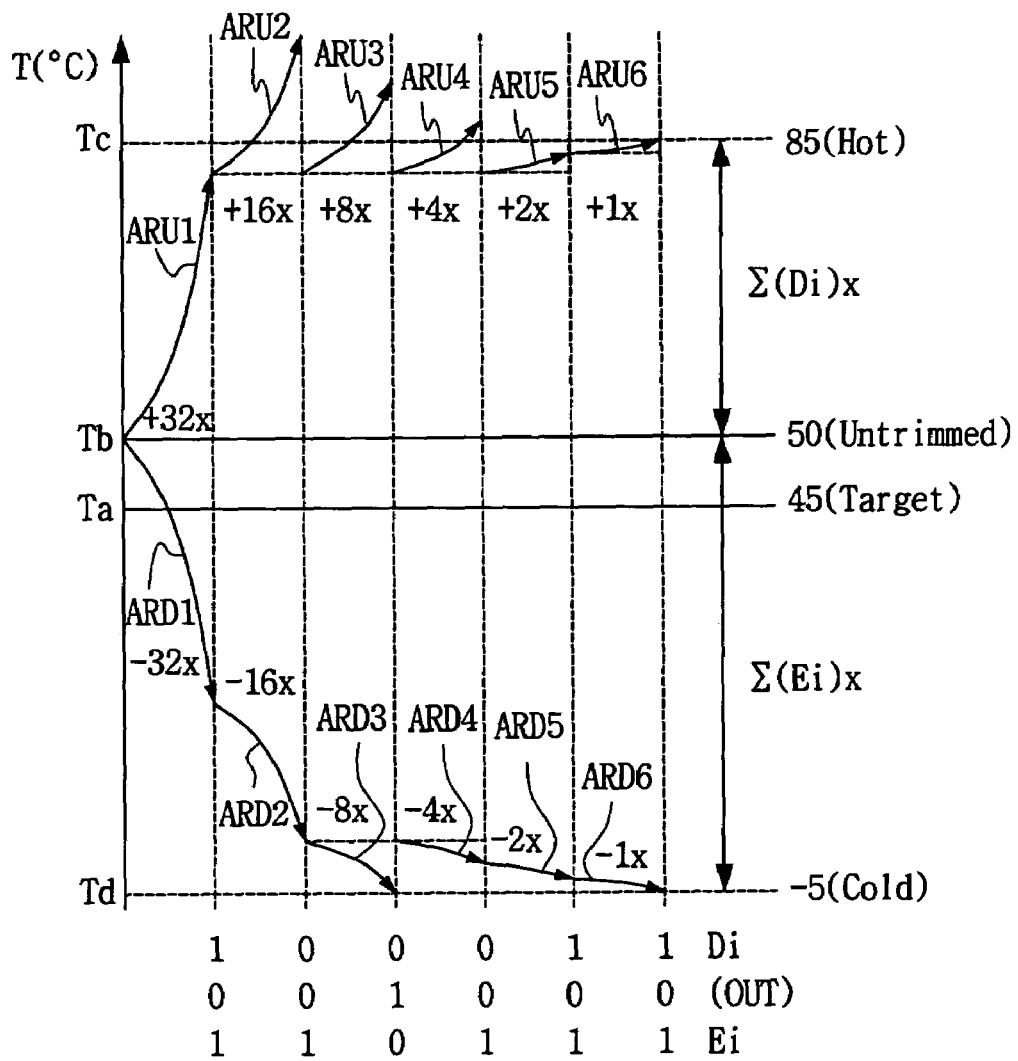
FIG. 10 is a graph for explaining methods of determining a shift temperature of the temperature sensor shown in FIG. 4.

In FIG. 10, it is assumed that the temperature sensor is designed for a target trip temperature Ta of 45° C. Also, it is assumed that process variations have resulted in a shift temperature (error) of 5° C., whereby the unknown actual trip temperature Tb of the sensor is 50° C. In FIG. 10, the y-axis denotes temperature, and the x-axis denotes a sequence of process steps.

Figure 6:
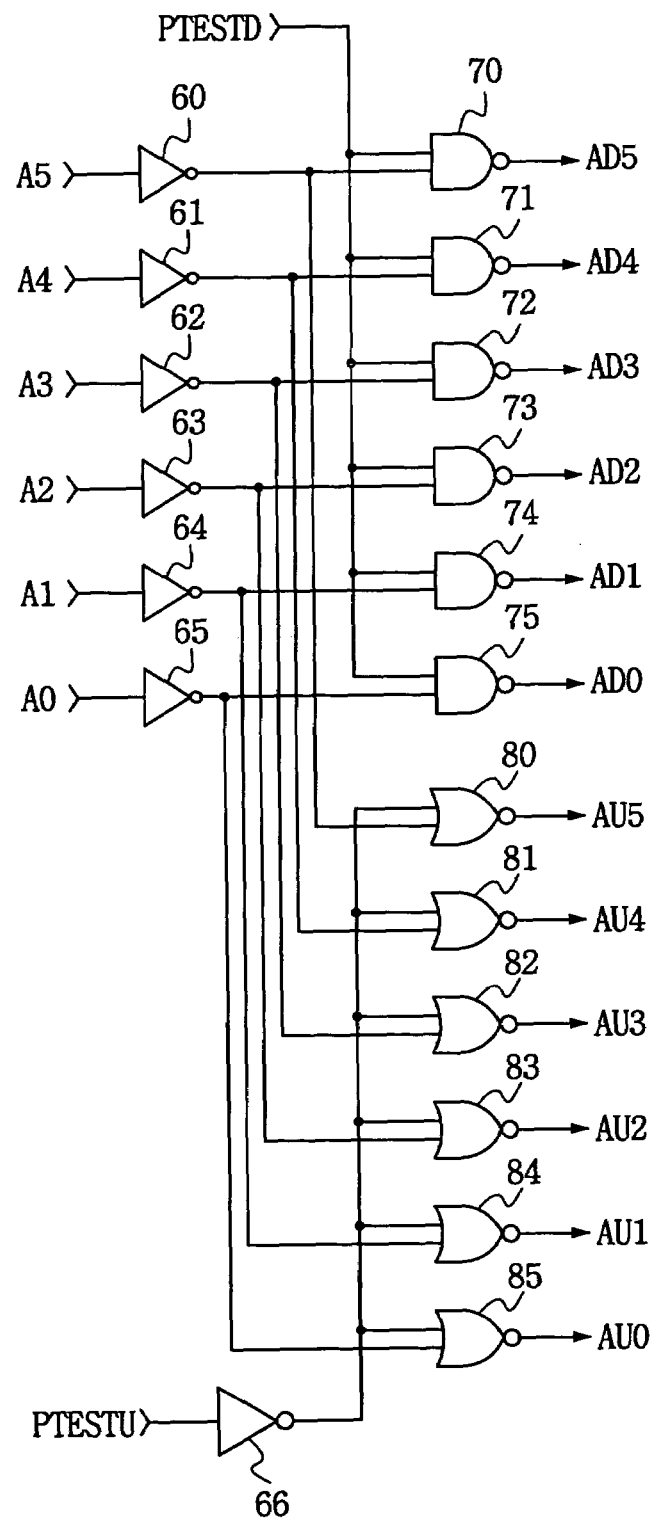
FIG. 6 is a circuit diagram of a signal generator for generating test input signals applied to the temperature sensor of FIG. 4.

FIG. 6 is a circuit diagram of a signal generator for generating test input signals AD0–AD5 and AU0–AU5 applied to the circuit of FIG. 4. Inverters 60–65 invert the logic state of input signals A5–A0. As shown, outputs of the inverters 60–65 are provided as one input of NAND gates 70–75 and NOR gates 80–85. A first test signal PTESTD is commonly applied to the other inputs of the NAND gates 70–75, and a second test signal PTESTU is commonly applied through an inverter 66 to the other inputs of the NOR gates 80–85.

The graph of FIG. 10 illustrates two successive process sequences, namely, a first sequence where the chamber temperature is Tc, the first input test signal PTESTU is HIGH and the second PTESTD signal is LOW, and a second sequence where the chamber temperature is Td, the first input test signal PTESTU is LOW and the second PTESTD signal is HIGH. The first sequence is illustrated by the arrows ARU1–ARU6, and the second sequence is illustrated by the arrows ARD1–ARD6.

During the first sequence, PTESTD is LOW, so AD0–AD5 are all HIGH regardless of the logic states of A0–A5. As such, all of the resistors RD1–RD6 are bypassed by the transistors TR0a–TR5a. Also, during the first sequence, PTESTU is HIGH, so the logic states of AU1–AU5 are the same as the logic states of A1–A5.

The first sequence is then carried out at Tc=85° C. in the same manner as described above in connection with FIG. 8. That is, input test signals A0–A5 are set and the comparator output OUT is monitored to execute a binary successive approximation method. As with FIG. 8, the result is a search code Di of "1,0,0,0,1,1", which translates in decimal form to 35° C.

Upon completion of the first sequence, the chamber temperature is set to Td=−5° C. and the second sequence is then executed. During the second sequence, PTESTU is LOW, so AU0–AU5 are all LOW regardless of the logic states of A0–A5. As such, all of the resistors RU1–RU6 are connected to the branch C of the comparator circuit 100. Also, during the second sequence, PTESTD is HIGH, so the logic states of AD1–AD5 are the same as the logic states of A1–A5.

The second sequence is then carried out at Td=−5° C. in an opposite direction to that of the first sequence. That is, input test signals A0–A5 are set and the comparator output OUT is monitored to execute a binary successive approximation method in which trip temperature is decreased by the selective addition of the resistors RD1–RD6 to the resistive path connected to branch C. In this case, the comparator circuit 100 effectively compares the decreased trip temperatures at D1–D6 of the sequence with the temperature Td to generate the outputs OUT.

That is, at D1 of FIG. 10, the test signal AD5 is set to 0, thus turning off the transistor TR5 and connecting the resistor RD6 to the branch C of the comparator circuit 100. Here, AD5–AD0 is a six bit signal of "0,1,1,1,1,1". This results in a 32° C. decrease in the actual trip temperature Tb (i.e., Tb=50° C.−32° C.=18° C.). Since the chamber temperature Td (−5° C.) is less than the decreased actual trip temperature Tb, the output OUT of the comparator circuit is LOW (L).

In the binary successive approximation method of the present embodiment, since the output OUT of the comparator circuit 100 was LOW (L) at D2 of FIG. 8, AD5 remains set at 0 for the rest of the process sequence. On the other hand, if the output OUT had been HIGH (H), than AD5 would be set at 1 for the rest of the process sequence.

Next, at D2 of FIG. 10, AD4 is set to 0, whereby AU5–AU0 is a six bit signal of "0,0,1,1,1,1". This results in a 48° C. decrease in the actual trip temperature Tb (i.e., Tb=50° C.−32° C.−16° C.=2° C.). Since the chamber temperature Td (−5° C.) is still less than the decreased actual trip temperature Td, the output OUT of the comparator circuit remains LOW (L).

The output OUT was LOW (L) at D2, so the signal AD4 remains set to 0 for the rest of the process sequence. Also, the signal AD3 is now set to 0 at D3, whereby AD5–AD0 is a six bit signal of "0,0,0,1,1,1". This results in a 56° C. decrease in the actual trip temperature Tb (i.e., Tb=50° C.−32° C.−16° C.−8° C.=−6° C.). Since the chamber temperature Td (−5° C.) is now greater than the decreased actual trip temperature Td, the output OUT of the comparator circuit becomes HIGH (H).

Since the output OUT was HIGH (H) at D3, the signal AD3 is set to 1 for the rest of the process sequence. Also, the signal AU2 is now set to 0 at D4, whereby AD5–AD0 is a six bit signal of "0,0,1,0,1,1". This results in a 52° C. decrease in the actual trip temperature Tb (i.e., Tb=50° C.−32° C.−16° C.−4° C.=−2° C.). Since the chamber temperature Tc (−5° C.) is less than the decreased actual trip temperature Tb, the output OUT of the comparator circuit becomes LOW (L).

The output OUT was LOW (L) at D4, so the signal AD2 is set to 0 for the rest of the process sequence. Also, the signal AU1 is now set to 0 at D5, whereby AD5–AD0 is a six bit signal of "0,0,1,0,0,1". This results in a 54° C. decrease in the actual trip temperature Tb (i.e., Tb=50° C.−32° C.−16° C.−4° C.−2° C.=−4° C.). The chamber temperature Tc (−50° C.) is still less than the actual trip temperature Td, and the output OUT of the comparator circuit remains LOW (L).

The output OUT was LOW (L) at D5, so the signal AD1 is set to 0 for the rest of the process sequence. Also, the signal AU0 is now set to 0 at D6, whereby AD5–AD0 is a six bit signal of "0,0,1,0,0,0". This results in a 35° C. increase in the actual trip temperature Tb (i.e., Tb=50° C.−32° C.−16° C.−4° C.−2° C.−1° C.=−5° C.). The chamber temperature Td (−5° C.) is now about equal to the actual trip temperature Td, and in this example, the output OUT of the comparator circuit remains LOW (L).

The second sequence is now complete, and the final set values of AU5–AU0 are inverted to obtain a search code Ei of "1,1,0,1,1,1", which translates in decimal form to 55° C. The difference between 55° C. and the chamber temperature Td (−5° C.) is the actual trip temperature Tb of the temperature sensor (50° C.).

In the example of FIG. 10, both the first and second sequences yielded the same result, namely, that the actual trip temperature of the sensor is 50° C. This means that the unit resistive amount (RU1 and RD1) of the resistor strings ideally resulted in a trip temperature increase/decrease of 1° C. In other words, "X=1".

However, as suggested previously, the ideal condition of X=1 is not always obtainable. According to the present embodiment, the actual value of X can be easily calculated as follows:

$$(Di+Ei)_{decimal}/(Tc-Td)=X$$

In the example of FIG. 10, for example, X is calculated as follows:

$$(35° C.+55° C.)/((85° C.-(-5° C.))=1$$

If it is determined that X≠1, then the deceminal equivalents of Di and/or Ei can be adjusted accordingly when calculating the actual trip temperature Tb. More particularly, the error rate X can be taken into account in the trimming work. For example, when an error rate of X=0.9 is detected, than the shift temperature has been underestimated, and additional trimming should be needed. When an error rate of X=1.1 is detected, than the shift temperature has been overestimated, and less trimming should be needed. Given the measured shift temperature and the error rate X, the trimming operation can be appropriately executed.

Once the proper shift temperature is determined, a trimming process is executed to bring the actual trip temperature of the sensor to the target trip temperature. To this end, the embodiment of FIG. 4 is additionally equipped with circuitry for executing a trimming operation. In particular, the temperature increase trimming portion 200 is provided for increasing the trip temperature, and the temperature decrease trimming portion 300 is provided for decreasing the trip temperature.

The temperature increase trimming portion 200 is constructed of N-type MOS transistors N5–N0 whose drain-source channels are connected in series, and of first-sixth resistance switching units 210–215. Before a temperature trimming operation is performed, the N-type MOS transistors N5–N0 are all turned OFF.

Figure 5:
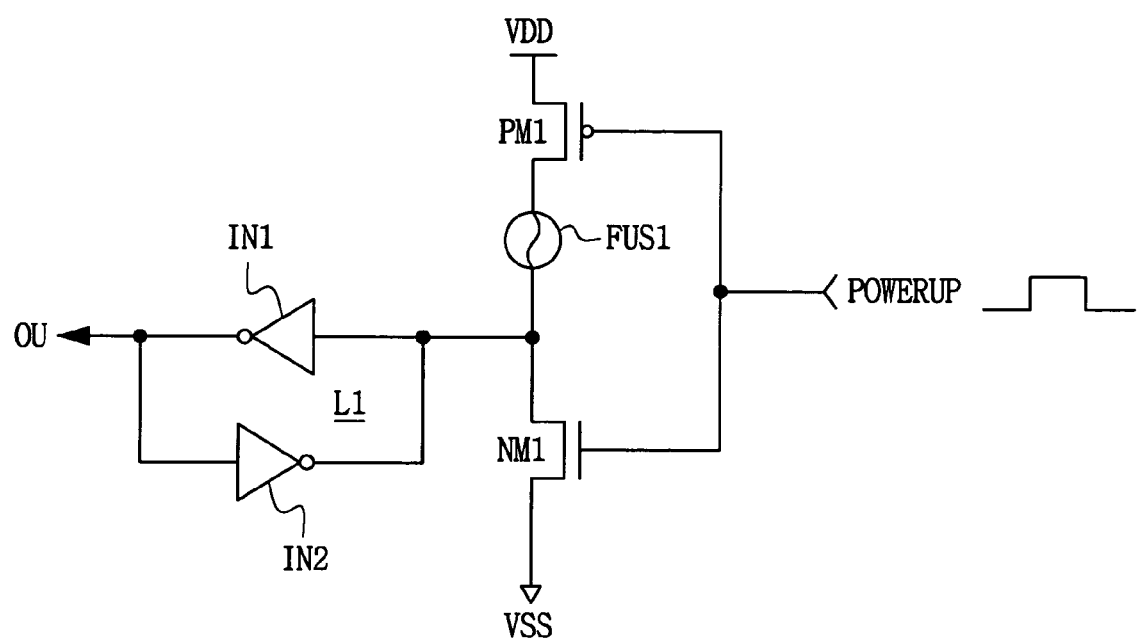
FIG. 5 is a circuit diagram of a resistance switching unit of the temperature sensor of FIG. 4.

FIG. 5 is a circuit diagram showing one of the resistance switching units of FIG. 4. The resistance switching unit includes P-type and N-type MOS transistors PM1, NM1 which form an inverter, inverters IN1, IN2 which form a latch L1, and a fuse FUS1. Initially, the fuse FUS1 is not cut, and the P-type MOS transistor PM1 is turned on by a power-up signal POWERUP which is transitioned from a high state to a low state. Thus, an output OU of the latch L1 is fixed at a low state.

Still referring to FIG. 5, if the fuse FUS1 is cut during a trimming operation, the N-type MOS transistor NM1 is turned on by the power-up signal POWERUP, which causes the output OU of the latch L1 to be fixed at a high state.

Upward trimming may be executed by selectively cutting the fuses FUS1 of the resistance switching units 210–215. For example, if there is a shift temperature of −5° C. to be compensated, than the fuse FUS1 within the forth and sixth resistance switching units 213, 215 of the temperature increase trimming part 200 should be blown/cut. In this manner, resistors RU3 and RU1 are bypassed.

The temperature decrease trimming portion 300 is connected between nodes N03 and VSS and is configured by a binary weighted resistance string of resistors RD1a, RD2a, RD3a, RD4a, RD5a and RD6a, where, $$RDa6=2·RDa5=4·RDa4=8·RDa3=16·RDa2=32·RDa1.$$

In addition, the temperature decrease trimming portion 300 includes series connected fuses FU1–FU6 coupled across the resistor RD1a–RD6a as shown. In an initial state, none of the fuses FU1–FU6 are cut, and accordingly, all of the resistors RD1a–RD6a are bypassed.

Upward trimming may be executed by selectively cutting the fuses FUS1 of the resistance switching units 210–215. For example, if there is a shift temperature of +5° C. to be compensated, than the fuses FU1 and FU3 of the temperature decrease trimming part 200 should be blown/cut. In this manner, resistors RD1a and RD3a are connected to the branch C of the comparator circuit 100.

Figure 7:
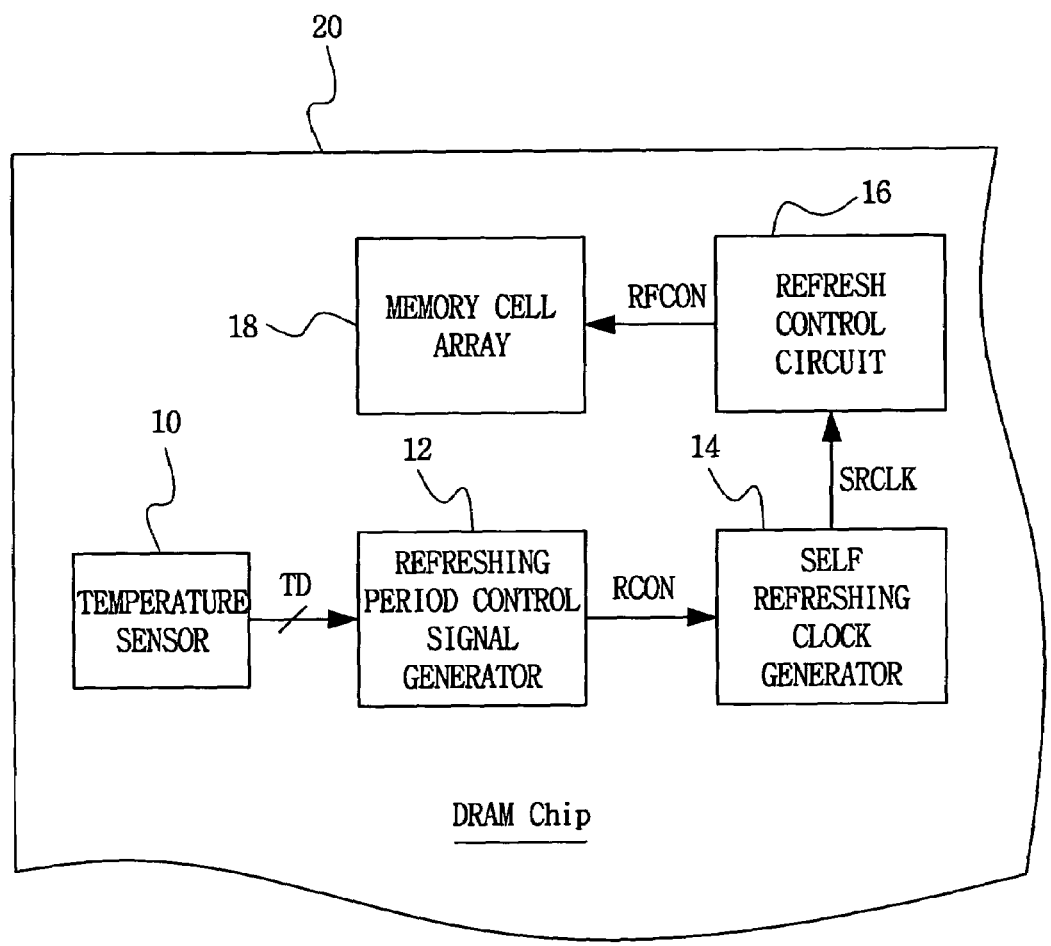
FIG. 7 is a block diagram for describing a refresh operation of a semiconductor memory device employing a temperature sensor of FIG. 4.

FIG. 7 is a block diagram for explaining a refresh operation of a semiconductor memory device employing a temperature sensor of the present invention. With reference to the drawing, a temperature sensor 10 of the embodiment of FIG. 3 or FIG. 4 is installed within a DRAM chip 20. The temperature sensor 10 is located in the neighborhood of a memory cell array 18 and applies a temperature sensing output TD to a refresh period control signal generator 12. The refresh period control signal generator 12 is responsive to the temperature sensing output TD to set a refresh period as indicated in an output control signal RCON. A self refreshing clock generator 14 generates a self refreshing clock SRCLK having a frequency corresponding to the output control signal RCON. A refresh control circuit 16 controls a refresh operation of the cell array 18 in response to the self refreshing clock SRCLK. In operation, the refresh operation period is increased in the case where the temperature detected by the sensor 10 is low, as compared with the case where the temperature detected by the sensor 10 is high. In this manner, power consumption is reduced.

In the drawings and specification, there have been disclosed typical preferred embodiments of this invention and, although specific terms are employed, they are used in a generic and descriptive sense only and not for purposes of limitation, the scope of the present invention being set forth in the following claims.

What is claimed is:

1. A temperature sensor, comprising:
a comparator circuit having an output node and a variable current node, wherein the output node is a first voltage at a given temperature when a current at the variable current node is less than a threshold current, and a different second voltage at the given temperature when the current at the variable current node is more than the threshold current;
first and second variable resistance circuits connected in series between the variable current node of the comparator and a supply voltage, wherein the first variable resistance circuit includes m resistors connected in series, where n is an integer of 4 or more and the m resistors have different resistance values from each other, and wherein the second variable resistance circuit includes n resistors connected in series, where m is an integer of 4 or more and the n resistors have different resistance values from each other;
a first switching circuit which selectively bypasses individual ones of the m resistors of the first variable resistance circuit; and
a second switching circuit which selectively bypasses individual ones of the n resistors of the second variable resistance circuit,
wherein the first switching circuit comprises at least m transistors connected across respective ones of the m resistors, wherein gate terminals of the m transistors are responsive to a first input test signal to selectively bypass the m resistors, respectively, and wherein the second switching circuit comprises at least n transistors connected across respective ones of the n resistors, wherein gate terminals of the n transistors are responsive to a second input test signal to selectively bypass the n resistors, respectively.

2. The temperature sensor of claim 1, wherein m equals n, and wherein resistance values of the m resistors of the first variable resistance circuit are respectively the same as resistance values of the n resistors of the second variable resistance circuit.

3. The temperature sensor of claim 2, wherein one resistor among the n resistors has a lowest resistance value, and wherein the remaining resistors among the n resistors have resistance values which are multiples of the resistance value of the lowest resistance value.

4. The temperature sensor of claim 2, wherein one resistor R1 among the n resistors has a lowest resistance value x, and wherein the remaining resistors R2, R3, ... Rn-1 among the n resistors have resistance values of x·2, x·4, ... , x·(2n-1).

5. The temperature sensor of claim 1, further comprising a trimming circuit connect in parallel to the first variable resistance circuit, wherein the trimming circuit includes a second set of m transistors connected across the m resistors of the first variable resistance circuit, respectively, and m latch circuits which selectively latch the gates of the second set of m transistors to a high voltage.

6. The temperature sensor of claim 2, further comprising a trimming circuit connect in parallel to the first variable resistance circuit, wherein the trimming circuit includes a second set of m transistors connected across the m resistors of the first variable resistance circuit, respectively, and m latch circuits which selectively latch the gates of the second set of m transistors to a high voltage.

7. The temperature sensor of claim 3, further comprising a trimming circuit connect in parallel to the first variable resistance circuit, wherein the trimming circuit includes a second set of m transistors connected across the m resistors of the first variable resistance circuit, respectively, and m latch circuits which selectively latch the gates of the second set of m transistors to a high voltage.

8. The temperature sensor of claim 4, further comprising a trimming circuit connect in parallel to the first variable resistance circuit, wherein the trimming circuit includes a second set of m transistors connected across the m resistors of the first variable resistance circuit, respectively, and m latch circuits which selectively latch the gates of the second set of m transistors to a high voltage.

* * * * *